United States Patent
Nations et al.

(10) Patent No.: US 6,879,808 B1
(45) Date of Patent: Apr. 12, 2005

(54) BROADBAND COMMUNICATION SYSTEMS AND METHODS USING LOW AND HIGH BANDWIDTH REQUEST AND BROADCAST LINKS

(75) Inventors: William D. Nations, Los Altos, CA (US); David S. Puente, Brookville, MD (US); Robert E. Berry, Los Altos, CA (US)

(73) Assignee: Space Systems/Loral, Inc, Palo Alto, CA (US)

(*) Notice: Subject to any disclaimer, the term of this patent is extended or adjusted under 35 U.S.C. 154(b) by 484 days.

(21) Appl. No.: 09/713,121

(22) Filed: Nov. 15, 2000

(51) Int. Cl.[7] .................................................. H04Q 7/20
(52) U.S. Cl. ..................................... 455/12.1; 455/3.01
(58) Field of Search ............................... 455/12.1, 725, 455/3.01, 3.02, 427, 430, 3.05; 370/310, 316, 395.41, 395.64, 395.65; 342/410; 725/62, 63, 64, 68, 105, 71, 106, 109, 110, 73, 81; 709/230–238

(56) References Cited

U.S. PATENT DOCUMENTS

| | | | | |
|---|---|---|---|---|
| 5,914,942 A | * | 6/1999 | Hassan et al. | 370/316 |
| 5,963,862 A | * | 10/1999 | Adiwoso et al. | 455/430 |
| 5,991,596 A | * | 11/1999 | Cunningham et al. | 455/12.1 |
| 6,020,845 A | * | 2/2000 | Weinberg et al. | 342/354 |
| 6,038,594 A | * | 3/2000 | Puente et al. | 709/217 |
| 6,041,233 A | * | 3/2000 | Rosati | 370/316 |
| 6,141,564 A | * | 10/2000 | Bruner et al. | 455/558 |
| 6,151,497 A | * | 11/2000 | Yee et al. | 455/12.1 |
| 6,160,993 A | * | 12/2000 | Wilson | 455/12.1 |
| 6,181,734 B1 | * | 1/2001 | Palermo | 375/219 |
| 6,201,797 B1 | * | 3/2001 | Leuca et al. | 370/316 |
| 6,205,485 B1 | * | 3/2001 | Kikinis | 709/231 |
| 6,208,626 B1 | * | 3/2001 | Brewer | 370/310 |
| 6,233,451 B1 | * | 5/2001 | Noerpel et al. | 455/427 |
| 6,519,262 B1 | * | 2/2003 | Stephens et al. | 370/442 |
| 6,526,580 B2 | * | 2/2003 | Shimomura et al. | 725/63 |
| 2002/0129116 A1 | * | 9/2002 | Humphrey | 709/217 |

* cited by examiner

Primary Examiner—Jean Gelin
(74) Attorney, Agent, or Firm—Karambelas & Associates (57) ABSTRACT

Broadband data transmission systems and methods that provide point-to-multipoint broadcasting capability to implement Internet access and multimedia distribution services for a very large number of users. An exemplary system comprises a two-way communication link having at least one satellite, at least one user terminal that has two-way communication with the two-way communication link, and at least one gateway that has access to data and has two-way communication with the two-way communication link. The two-way communication link may comprise a low bandwidth two-way communication link, or a low bandwidth request link and high bandwidth data broadcast link. The high bandwidth link preferably broadcasts a wide area coverage beam to allows the requested information to be received by many terminals. The terminal and gateway may each include a cache. Software at the gateway operates to deliver requested data and related data to users using the user's request history and/or user profile. The requested (and related) data (such as a predetermined number of most-requested web pages) may be broadcast at predetermined intervals to simulate real-time broadcasts. Another exemplary system comprises a terrestrial communication link for communicating data requests, a satellite broadcast link for transmitting the requested data, at least one gateway having access to data that communicates with the terrestrial communication link and the satellite broadcast link, and at least one user terminal that communicates with the terrestrial communication link and the satellite broadcast link that caches the requested (and related) data transmitted by the satellite broadcast link. Broadband data transmission methods are also disclosed.

30 Claims, 4 Drawing Sheets

BROADBAND COMMUNICATION SYSTEMS AND METHODS USING LOW AND HIGH BANDWIDTH REQUEST AND BROADCAST LINKS

BACKGROUND

The present invention relates generally to data transmission systems such as satellite communication systems, and more particularly, to a satellite-based broadband two-way Internet access system for providing Internet access and services to consumers. The present invention also relates to Internet communications systems and methods that provide low and high bandwidth request and broadcast satellite links and that use request history and user profiles to provide requested and related information or data to requesting users.

The assignee of the present invention manufactures and deploys communication satellites for providing global communication services. The assignee of the present invention also operates a data services business, which is a global information delivery company that provides multimedia (video, data and voice) data distribution and Internet access and services to its customers. This data services business delivers multimedia data to business enterprises and provides Internet access and services for business enterprises and Internet Service Providers (ISPs).

Currently, the data services business provides access to US-based Internet content to more than 130 ISPs in over 32 countries, distributes high-speed data over private corporate VSAT-based (very small aperture terminal) networks, and offers business television services by way of satellite to corporations for the delivery of teleconferences, distance learning and training, and special events. However, there is a need for the delivery of broadband services to consumers which is driven by the growth of the Internet.

It is believed that much of the demand for services and connectivity will go unanswered by current terrestrial technologies, including cable modems and digital subscriber lines (DSL), whose infrastructures will fail to reach significant portions of the world population in the near term. It would be advantageous to have a satellite-based broadband two-way Internet access and delivery system for use by consumers (end users) that offers advantages over terrestrial systems including point-to-multipoint broadcasting capability, with geographic ubiquity and high capacity, and which is provided to consumers at a relatively low cost.

Therefore, it is an objective of the present invention to provide for an improved satellite-based broadband two-way Internet access system for providing Internet access and services to consumers.

The Internet is a collection of independent computer networks that communicate with each other using standard communication protocols. By using such standard protocols, any user on any network can access any server on any other network on the Internet, subject to security considerations.

Entry into the Internet is typically furnished by internet service providers that operate networks that connect with each other at network access points. A typical network includes communication links and routers. A router includes tables that correlate addresses with destination information. Routing protocols are used to keep the information in the routing tables up to date to ensure that the information tables contain accurate information. Information is transmitted between network access points in the form of individual data packets. Each packet contains an embedded source and destination address to which the packet is routed across the networks.

Conventional Internet routing of information and data has been achieved by way of terrestrial interconnections using land-based electrical connections or land-based wireless connections. Data transfer speed is typically limited by the speed of the router or modem that a user employs. The vast majority of current users have relatively low speed modems that are used for routing information, although integrated services digital network (ISDN) and digital subscriber line (DSL) connections are now available that improve upon the data transfer speed. Corporate entities typically implement frame relay, T1 or T3 connections to provide fast or high volume interconnectivity.

In order to improve upon the ability to deliver large amounts of information to a large number of users, the assignee of the present invention and its affiliates have developed a satellite-based data delivery system that integrates with the Internet to deliver high speed information and data delivery services. This system is generally described in U.S. Pat. No. 6,038,594 issued Mar. 14, 2000, which is assigned to the assignee of the present invention.

The system disclosed in U.S. Pat. No. 6,038,594 allows users to request information from a source connected to the Internet and receive the requested information by way of a satellite communications link. The system disclosed in U.S. Pat. No. 6,038,594 also provides point-to-multipoint interconnectivity that allows multiple users to request information from a source connected to the Internet and to receive the requested information substantially simultaneously by way of the satellite communications link which is used to broadcast the data to the requesting users.

Conventional Internet routing of requests for information has been achieved by transmitting the requests by way of land-based electrical and/or wireless connections to the source of the information. While the requests for the information are relatively small in size, they still take up available bandwidth and help to clog the Internet.

It would be an improvement to have a system and method that allows for routing of requests and transmission of the requested information by way of a satellite communications link. It would also be an improvement to have a system and method that allows for routing of requests by way of a low bandwidth communication path and transmission of the requested information by way of a high bandwidth communication path used by a satellite communications link. It is therefore an objective of the present invention to provide for an Internet communications system and methods that provide low and high bandwidth request and broadcast satellite links.

Furthermore, in the past, requests for information have generally been processed in a manner that delivers only the specifically requested information. Heretofore, no known Internet-based system or method has provided the ability to deliver both the specifically requested information and also related information. It is therefore another objective of the present invention to provide for Internet communications systems and methods that has the ability to automatically deliver both requested and related information to users.

SUMMARY OF THE INVENTION

To accomplish the above and other objectives, the present invention provides for satellite-based broadband data transmission systems and methods that implement point-to-multipoint broadcasting capability to provide geographic ubiquity and high capacity. The system is designed to provides Internet access and services along with multimedia (video, data and voice) distribution capability for a substantially large number of end users. The number of users is much larger than conventional data distribution systems having substantially the same transmission rate. The system may be used to provide two-way Internet access for consumers that are underserved by terrestrial systems. The system is primarily designed to provide Internet access and provide a data transport vehicle for data derived from Internet Service Providers.

An exemplary system comprises a two-way communication link having at least one satellite. At least one user terminal is provided that has two-way communication with the two-way communication link. At least one gateway is provided that has access to data and has two-way communication with the two-way communication link.

The two-way communication link may comprise a low bandwidth two-way communication link, or a low bandwidth request link and a high bandwidth data broadcast link. The high bandwidth link preferably broadcasts a wide area coverage beam to allows the requested information to be received by multiple user terminals. The user terminal and the gateway each preferably include a cache. Software at the gateway operates to deliver requested data along with data related to the requested data to requesting users using a user's request history and/or user profile.

Another exemplary system comprises a terrestrial communication link for communicating data requests, and a satellite broadcast link for transmitting the requested data. At least one gateway having access to data communicates with the terrestrial communication link and the satellite broadcast link. At least one user terminal communicates with the terrestrial communication link and the satellite broadcast link that caches the requested data (and related data) broadcast by the satellite broadcast link. Broadband data transmission methods are also disclosed.

The low bandwidth communication link may be implemented using a Ka-band payload or satellite, for example, while the high bandwidth data broadcast link may be implemented using a Ku-band payload or satellite, for example. The at least one satellite provides "bent pipe" retransmission between a user terminal (consumer premises equipment) and the at least one gateway. The at least one user terminal preferably receives multicasts and data streaming using a high bandwidth link, and on-demand Internet access using a low bandwidth link. The user terminals transmit Internet requests using a low bandwidth link. The user terminals may store multicast and streaming data in the cache.

Furthermore, in a preferred embodiment of the present invention, the software at the gateway operates to automatically broadcast the most requested information (such as a predetermined number of the most requested web pages, for example) to terminals in a substantially real-time manner. The most requested information is broadcast at predetermined intervals, such as every 7–10 seconds, for example, to simulate real-time information broadcasts.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

In general, the present invention provides for broadband data transmission systems and methods. The term broadband is used herein to mean that the data transmission rate is greater than or equal to 56 kilobits per second (Kbps). The systems and methods will be described with reference to the drawing figures, which illustrate preferred embodiments of the present invention comprising satellite-based broadband data transmission systems and associated data transmission methods.

In preferred embodiments of the present invention, the systems and methods provide access to data using various combinations of satellite communication links including low bandwidth data request and delivery channels, a low bandwidth data request channel and a high bandwidth data delivery (broadcast or multicast) channel, along with terrestrial data request and delivery channels. Furthermore, the systems and methods implemented in accordance with the present invention may employ smart caching at user sites along with caching at a central location (gateway) where data is obtained and transmitted to the user sites.

Figure 1:
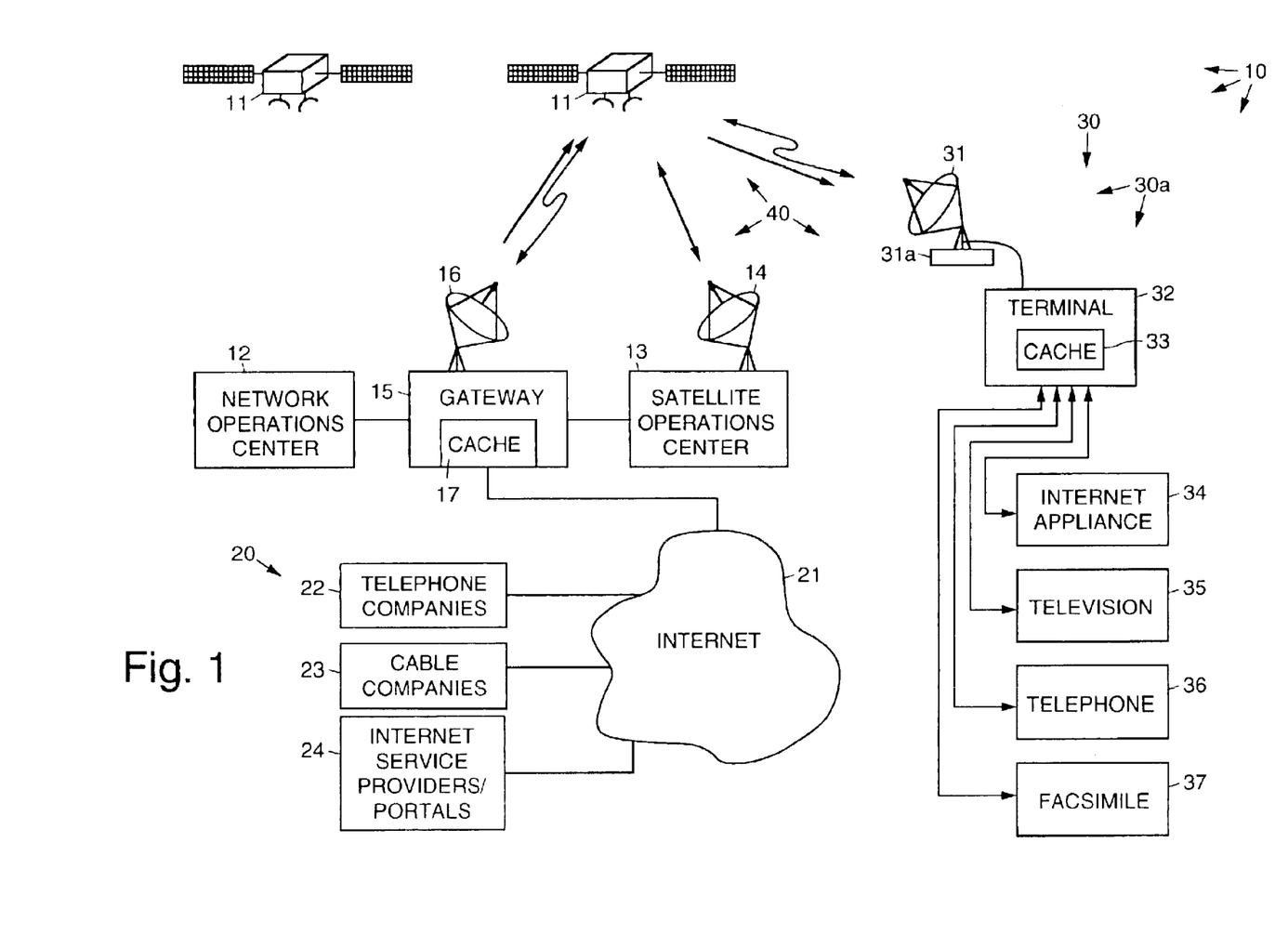
FIG. 1 illustrates an exemplary embodiment of a satellite-based broadband two-way Internet access system in accordance with the principles of the present invention.

Specifics of the above-mentioned aspects of the present invention will be described in greater detail with reference to the drawing figures. Referring first to FIG. 1, it illustrates an exemplary preferred embodiment of a broadband data transmission system 10 that comprises a satellite-based broadband Internet access system 10. The satellite-based broadband Internet access system 10 provides Internet access and services for a very large number of users and is capable of providing video, data and voice distribution services. The number of users is much larger than conventional systems having substantially the same transmission rate. It is to be understood, however, that the presently disclosed systems 10 (and methods) are not limited to providing Internet access only, but may readily be used to deliver data from any source to the users of the systems 10.

A presently preferred embodiment of the system 10 is specifically designed to provide consumer broadband services and streaming media services to a very large number of end users 30. This system 10 may be used to provide Internet access services in markets served by terrestrial-based service providers and also in areas beyond the reach of such providers.

The system 10 illustrated in FIG. 1 comprises one or more satellites 11, which may be geosynchronous satellites 11 such as Telstar and CyberStar satellites 11 deployed by the assignee of the present invention, for example. The assignee of the present invention currently has a ten-satellite fixed satellite service (FSS) constellation of satellites 11 in orbital slots around the Earth that may be used in the system 10. A satellite operations center 13 having one or more antennas 14 is used to command and control the satellites 11.

A network operations center 12 is used to control the system 10. The network operations center 12 communicates with and controls one or more gateways 15 having one or more antennas 16 that are used to communicate with the satellites 11. The gateways 15 provide entry (peering) points to fiber networks and the Internet 21.

The one or more gateways 15 each include a cache memory 17 that is used to store data that is to be downloaded to the end users 30. The cache memory 17 has forward and return link system capacity when data is retrieved by the end users 30. However, the cache memory 17 does not require access to the Internet 21 when data is retrieved by the end users 30. Data requested by users are cached in the cache memory 17 at each gateway 15.

Service providers 20 such as telephone companies 22, cable companies 23 and Internet service providers 24 and whose customers are end users (consumers) are coupled by way of the Internet 21 to the one or more gateways 15. The service providers 20 provide Internet-related services to end users 30, which in the context of the present invention are consumers located at home or businesses.

The end users 30 have customer premises equipment 30a including an outdoor unit 31 having an antenna 31a and a user terminal 32 (indoor unit 32) that are used to communicate with one or more selected satellites 11. The user terminal 32 preferably comprises a set-top box with up to 30 gigabytes of storage connected to a single small satellite dish antenna 31a. The antenna 31a is designed to simultaneously communicate with at least two satellites 11. This allows the user terminal 32 to communicate over available low and high bandwidth satellite communication links depending upon data delivery requirements.

By way of example, a first satellite 11 may provide a low bandwidth communication link including low bandwidth data request and low bandwidth delivery channels. This link is illustrated by the double-arrowhead serpentine lines disposed between the antenna 16 at the gateway 15 and the rightmost satellite 11 and the double-arrowhead serpentine lines disposed between the rightmost satellite 11 and the antenna 31a of the user terminal 31. The low bandwidth communication link may be provided by a Ka band satellite 11 or Ka band payload on the first satellite 11.

A second satellite 11 may provide a high bandwidth data delivery (broadcast or multicast) channel, such as a Ku band satellite 11. Alternatively, the high bandwidth data delivery channel may be provided as a second Ku band payload on the first satellite 11. The high bandwidth data delivery (broadcast or multicast) channel is illustrated by the straight-arrowhead line pointing from the antenna 16 at the gateway 15 and the rightmost satellite 11 and the straight-arrowhead line pointing from the rightmost satellite 11 and the antenna 31a of the user terminal 31. It is to be understood that other suitable low and high bandwidth data request and delivery channels may readily be employed in the system 10.

The present invention also provides for the use of terrestrial data request and delivery channels in the event that the satellite communication links become temporarily inoperative. This feature allows continued data request and delivery services in the event of weather or communication link problems. This aspect of the present invention is illustrated more clearly in FIG. 3.

By way of example, the consumer premises equipment 30a used by the end users 30 also includes an Internet appliance 34 such as a personal computer 34 having a display, a television 35, a telephone 36, and a facsimile machine 37. The Internet appliance 34 or personal computer 34, television 35, telephone 36 and facsimile machine 37 are each connected to the user terminal 32.

In the preferred embodiment of the system 10 shown in FIG. 1, the one or more gateways 15, the one or more satellites 11 and the user terminals 32 cooperate to form a satellite comminations link 40 that interfaces the service providers 20 with the end users 30. The user terminals 32 are used to communicate by way of the satellites 11 and the one or more gateways 15 with the service providers 20, and vice-versa.

The user terminal 32 includes a cache memory 33 (also referred to as a smart cache) for storing downloaded data, typically during low usage periods. A preferred cache memory 33 has a size on the order of 30 gigabytes. The cache memory 33 requires no active system capacity when data is retrieved. The cache memory 33 does not require access to the Internet 21 when data is retrieved. Data is transferred from the cache memory 33 to the display connected to the Internet appliance 34 when requested by the end user 30.

Figure 2:
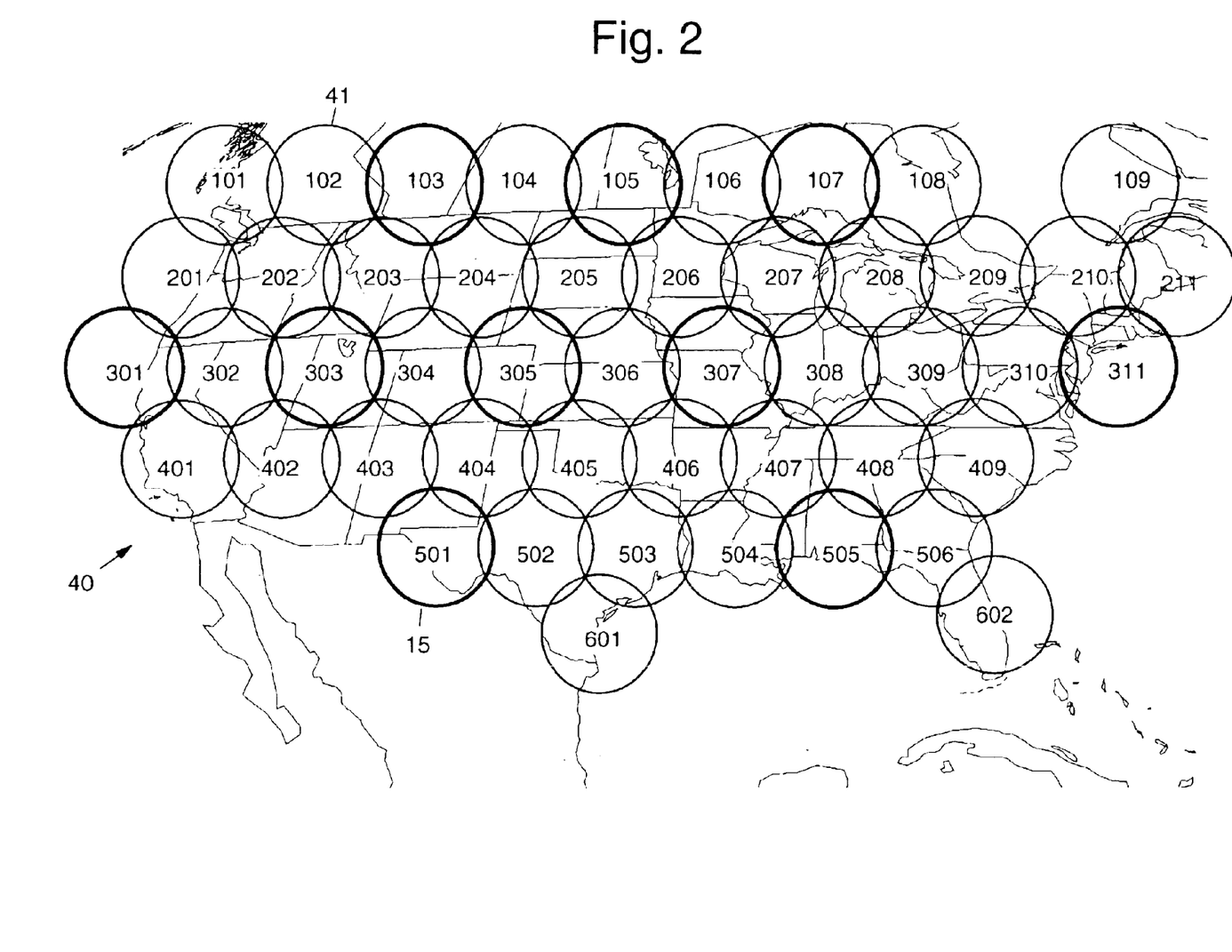
FIG. 2 shows a map of the United States illustrating beam coverage and gateway locations employed in the system shown in FIG. 1.

The exemplary preferred embodiment of the broadband data transmission system 10 shown in FIG. 1 thus provides for an Internet access system 10 that uses Ku- and Ka-band satellite-based communication links between the gateways 15 and the user terminals 32. The Ka-band (low bandwidth) communication link comprises a plurality of spot beams that overlay the coverage area. The Ku-band (high bandwidth) broadcast or multicast communication link comprises a broad beam that overlays the coverage area FIG. 2 shows a map of the United States illustrating the low bandwidth Ka-band beam coverage and locations of gateways 15 employed in the system 10. The circles shown in FIG. 2 represent spot beams 41 that is designed to provide complete coverage of the United States. Also shown in darker circles are locations of the gateways 15 within the United States. A network interconnecting the gateways 15 is used in the system 10 and is preferably a fiber network, although other types of networks may be employed.

In operation, requests for services or data are communicated from the end users 30 by way of the low bandwidth communication link and gateway 15 to the service providers 20. This may accomplished using the Ka-band communication link, for example. Requested data is communicated from the service providers 20 to the end users 30. Data communication from the service providers 20 may be provided using either the low bandwidth Ka-band communications link, or by using the high bandwidth Ku-band communications link. The Ku-band communications link is used as a one-way broadcast (multicast) link to the end user 30.

For example, an end user 30 may wish to use the Internet appliance 34 (such as the personal computer 34) to retrieve data from an Internet web site. A web browser on the Internet appliance 34 is used to access the web site by way of the end user's Internet Service Provider 24. A request for data is sent from the Internet appliance 34 to the terminal 31 and is transmitted (uplinked) by way of the (low bandwidth) satellite comminations link 40 to the gateway 15. The gateway 15 processes the request and forwards the request by way of the Internet 21 to the Internet Service Provider 24, and finally to the web site. Data that is downloaded from the web site is transferred by way of the Internet 21 to the gateway 15, and is then downlinked by way of either the low or high bandwidth communication link on the satellite 11 to the user terminal 32, which transfers the requested data to the Internet appliance 34.

If telephone communication is requested by the end user 30, such as by using Internet telephone software or the telephone 36, for example, the telephone number is dialed and is transmitted (uplinked) by way of the user terminal 32, satellite 11, gateway 15 and the Internet 21 to the appropriate telephone company 22. The call is routed to the appropriate telephone using the facilities of the telephone company 22 to complete the call. Full duplex voice transmission is thus provided by the telephone company facilities and the satellite comminations link 40 to the end user 30. The low bandwidth communication link is preferably used for both the forward and return paths between the end user 30 and the telephone company 22.

Similarly, an end user 30 may wish to view a video movie available from a cable company 23. A web browser or other software on the Internet appliance 34, or a set-top box provided by the cable company 23, for example, may be used to request the video movie. The request is transmitted (uplinked) by way of the low bandwidth satellite communications link 40, gateway 15 and Internet 21 to the cable company 23. Video data downloaded from the cable company 23 is transferred by way of the Internet 21 to the gateway 15, and is then downlinked by way of the (low and preferably high bandwidth) communication link 40 on the satellite 11 to the user terminal 32, which transfers the requested data to either the Internet appliance 34 or the user's television 35.

The broadband data transmission system 10 thus provides consumer broadband services and streaming media services to end users 30. The consumer broadband services provided by the system 10 provides affordable, ubiquitous, high-speed, two-way Internet access service employing a satellite network that avoids existing Internet congestion. When fully deployed, the exemplary preferred system 10 will be capable of serving at least ten million homes and small businesses in the western hemisphere. This large number of users has not heretofore been served by any conventional data transmission or distribution system. Thus, by employing the present system 10, Internet Service Providers 24, cable companies 23, and telephone companies 22, for example, have the ability to offer the high-speed, two-way Internet service to their customers (end users 30).

The system 10 is capable of receiving streaming multimedia in multicast mode at speeds of up to 30 megabits per second, and point-to-point Internet connectivity with downlink data rates of 1.5 megabits per second and uplink data rates of 128 kilobits per second or more. The end users 30 thus have access to stored or live multicasts, and both real-time and non-real-time streaming services. The service may be used by end users 30 that are beyond the reach of terrestrial systems and has several advantages over terrestrial systems including ubiquity, rapid deployment and capacity.

The system 10 provides streaming media services offered by Internet Service Providers 24 and corporations which currently reach approximately seven million residential and two-and-a-half million corporate end users 30 around the world. The system 10 provides fast delivery, on demand, of video content tailored to the needs of users 30, allowing the adoption of more sophisticated work processes and greater productivity. Content (data) is delivered either as a constant stream (push) or to cache servers at the Internet Service Provider 24 or enterprise facilities for distribution as requested by the end user 30 (pull). Delivering streaming media via satellite 11 allows for it to be broadcast simultaneously to multiple points, eliminating bottlenecks, improving quality, lowering costs and expanding content choices and applications.

The streaming media transmission capabilities of the system 10 provides for an Internet Protocol transport service. The system 10 allows content providers and applications service providers 24 to access the network implemented by the system 10 to reach end user 30 with their product offerings. Since content streams directly from servers at the respective provider 24, network congestion is eliminated.

The system 10 also provides content aggregation services. Content received at the network operations center 12 is stored on servers. The content is then encoded into digital format, and scheduled for delivery. The network operations center 12 monitors transmission to ensure a high quality of service and end user satisfaction. The system 10 and the service implemented thereby allows telephone companies 22, cable companies 23 and Internet Service Providers 24 to replicate their customized broadband applications and content (particularly video) to lower costs and improve the speed and quality of data delivery to the end users 30.

The system 10 also provides business portal services. Enterprise customers (corporations and other businesses) may be provided with a library of business-related content and applications (training, corporate communications, etc.), selected and aggregated at the network operations center 12 and accessed through a single Internet site. The business portal service provides basic hosting services for video content and also implements a means for providing advertising, eCommerce, subscriptions and pay-per-view services.

Figure 3:
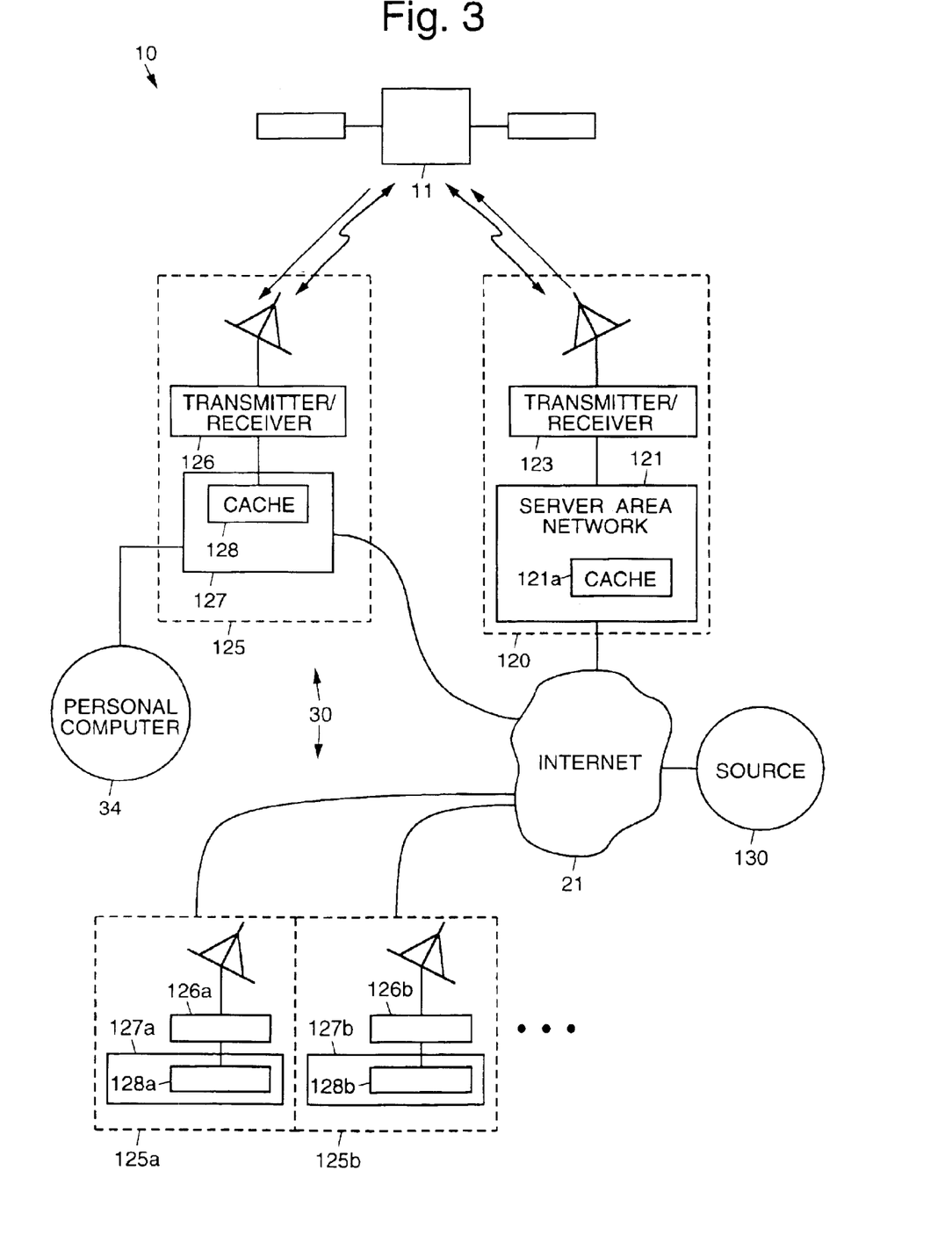
FIG. 3 is a block diagram that illustrates an exemplary Internet communications system in accordance with the principles of the present invention.

Further inventive aspects of the present invention will be described with reference to FIGS. 3–5 which show an embodiment of the system 10 in more detail. Referring to FIG. 3, it is a simplified block diagram that illustrates an exemplary broadband data transmission system 10 in accordance with the principles of the present invention. A preferred implementation of the system 10 includes a server area network 121 or server 121 (such as the previously-described gateway 15) that is coupled to the Internet 21 and coupled to a satellite transmitter/receiver 123 or router 123. The server area network 121 comprises a central or master cache 121a. The satellite transmitter/receiver 123 or router 123 receives requests from and transmits requested information to a satellite 11, such as a geosynchronous satellite 11, for example. Four geosynchronous satellites 11 effectively cover the Earth. Requests may also be received by way of the Internet 21.

The system 10 has a plurality of clients 125 which may be internet Service Providers or customers, such as corporate clients 125. Each of the clients 125 has a local proxy server 127–127b that is coupled to a satellite broadcast transmitter/receiver system 126–126b. The local proxy servers 127–127b each have an intelligent or smart local cache 128–128b for storing received information.

The smart local cache 128–128b is a high-speed storage mechanism comprising an independent high-speed storage device. The smart local cache 128–128b recognizes certain types of frequently-used data. The software implemented by the local proxy servers 127–127b and smart local cache 128–128b provide strategies that determine which information should be kept in the cache 128–128b.

The smart local cache 128–129b comprises software that implements certain novel aspects of the present invention which will be discussed in more detail below. The smart local cache 128–128b comprises a storage medium that is preferably a hard disk storage medium having a capacity on the order of 30 gigabytes, for example. The local proxy servers 127–127b are also coupled to the Internet 21.

The local proxy servers 127–127b may be in the form of a set-top-box, similar to a router or computer, for example, to which one or more personal computers 34 are connected, such as by way of a modem, or an intranet (Ethernet) connection, for example. The local proxy servers 127–127b are generally used by multiple users, such as in a corporate or business environment.

One aspect of the present invention is that the system permits transmission of requests to the server area network 121 in a number of ways. One way is by using the Internet 21 in a conventional manner. A preferred way is to route the requests by way of the satellite communications link comprising the (geosynchronous) satellite 11. The requests are routed by way of the low bandwidth communication path, such as by using a Ka-band communication link, for example. Other available low bandwidth communication channels available on the satellite 11 may also be employed. The Ka-band communication link provides for a plurality of spot beams that cover selected regions of the Earth, such as is shown in FIG. 2.

In the preferred embodiment, the requests for information are sent from the local proxy servers 127–127b by way of the low bandwidth Ka-band communication channel of the satellite 11 to the server area network 121. The request is processed at the server area network 121 to obtain the requested information, which is transmitted it to the requesting local proxy server 127–127b.

Once the requested information is obtained, the server area network 121 transmits the information by way of either the low bandwidth or a high bandwidth communication link, such as the Ka-band or a Ku-band communication link, for example. The Ku-band link is used to broadcast a wide area beam towards the Earth, which allows the requested information to be received by the requesting local proxy server 127–127b, as well as other local proxy servers 127–127b. This capability of the high bandwidth a Ku-band link is also important with regard to another aspect of the present invention which will discussed below.

In a preferred embodiment of the present invention, requests are sampled (picked up or polled) by respective ones of the Ka-band spot beams in which the clients 125 are located, for example, and are relayed to the server area network 121. The server area network 121 retrieves the requested information which is preferably located in the central cache 121a, or searches for and locates the information from one or more sources 130 (that provide content or information) that are connected to the Internet 21, for example. Once the requested information is obtained, it is transmitted by way of the high bandwidth link to all local proxy servers 127–127b within the coverage area of the wide area Ku-band beam. Alternatively, the requested information is transmitted by way of the low bandwidth link to the local proxy servers 127–127b.

As was mentioned previously, The may employ the use of terrestrial data request and delivery channels in the event that the satellite communication links become temporarily inoperative. This allows continued data request and delivery services in the event of weather or communication link problems. The connection paths provided by the Internet 21 that interconnects the server area network 121 and the local proxy servers 127–127b may be employed to achieve this. Alternatively, other communication paths, including wireless communication links, for example, may also be employed.

In a preferred embodiment of the system, requested information is transmitted (broadcast) at predetermined intervals, such as 7–10 second intervals, for example, to simulate real-time information broadcasts. Software running on the server area network 121 operates to automatically broadcast the most requested information (such as a predetermined number of the most requested web pages, for example) to the local proxy servers 127–127b in a substantially real-time manner, on the order of every 7–10 seconds, for example. The requesting local proxy server 127–127b stores the requested information in the smart local cache 28–28b.

In the event that the requested information is not present at the server area network 121 and must be retrieved from the Internet 21, the user may use his or her personal computers 34 for other purposes, or may turn it off. When the requested information is transmitted to the smart local cache 128–128b, the personal computer 34 is notified that the requested information has been retrieved. Thus, a message may be provided when the computer is on (or tunned on), similar to an E-mail notification, for example, that the requested information has been received and is available for viewing.

Another aspect of the system 10 is that it also has the ability to automatically deliver both requested information and information related to the requested information to users. As was mentioned above, the low bandwidth channel, and in particular, the Ka-band spot beams, may be used to gather requests from different geographical areas. A user may request substantially the same or similar information as other users. When the information requested by the user is acquired by the server area network 121 it is broadcast to all users within the coverage area of the high bandwidth the Ku-band broadcast beam. The requested information is preferably broadcast within a 7–10 second period.

In addition, the server area network 121 comprises software that searches for the specific information requested by a user as well as information related to the specifically requested information. The software running on the server area network 121 evaluates the qualitative content of the requested information using previous and current requests made by a specific user (such as is derived from a user profile) and retrieves or obtains similar or related information relating to the specifically requested information. The related information may be transmitted along with the requested information to the smart cache 128–128b, or the smart cache 128–128b may be updated at a later time after the requested information is transmitted. The related information is preferably broadcast at 7–10 second intervals.

Thus, when the user is prompted that the information request has been fulfilled, he or she will potentially find that additional information has been stored in the smart local cache 128–128b of the local proxy servers 127–127b that relates to the originally requested information. Furthermore, this additional information may be delivered concurrent with or at a later time from the time that the information was originally requested. The software operating on the server area network 121 thus finds requested information for a user based upon the history of prior requests for information or the profile of the user.

The smart local cache 128–128b at the respective local proxy server 127–127b receives and processes the received information. Software employed in the smart local cache 128–128b caches and/or stores the requested information. In addition, the software of the smart local cache 128–128b recognizes the information that is related to the requested information that was transmitted by the server area network 121. This related information is also cached and stored by the smart local cache 128–128b.

Figure 4:
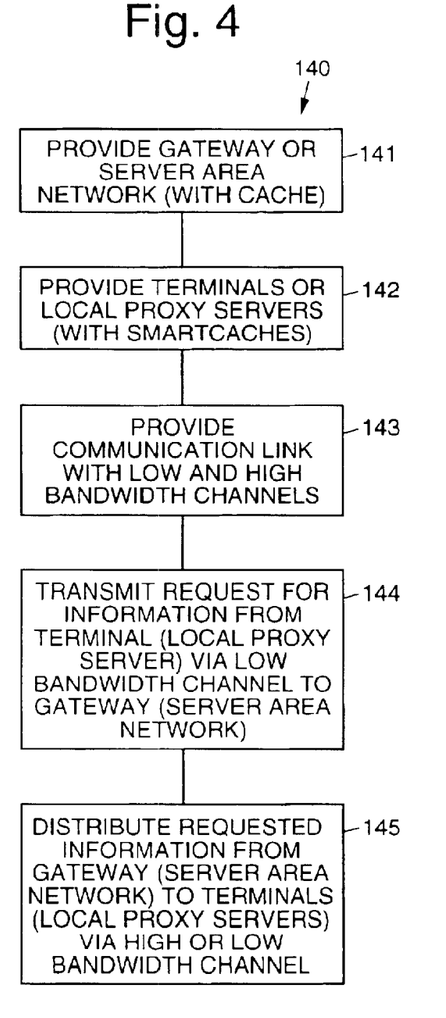
FIG. 4 is a flow diagram illustrating an exemplary Internet communications method in accordance with the principles of the present invention.

FIG. 4 is a flow diagram illustrating an exemplary data transmission method 140 in accordance with the principles of the present invention. This exemplary method 140 comprises the following steps.

A server area network 121 is provided 141 that comprises a cache and a satellite transmitter/receiver 123. The server area network 121 may be coupled to the Internet 21, for example. One or more local proxy servers 127–127*b* are provided 142 that comprise a smart local cache 128–128*b* for storing received information, and that are respectively coupled to a satellite broadcast transmitter/receiver system 126–126*b*. One or more satellites 11 are provided 143 that comprise low bandwidth request and broadcast communication channels, or low and high bandwidth request and broadcast communication channels, such as may be provided by Ka- and Ku-band communication channels, for example. Terrestrial request and reply communication links may optionally be employed to provide backup communication channels in lieu of the satellite communication channels, particularly if the satellite communication links are inoperative.

Requests for information are routed 144 from the one or more local proxy servers 127–127*b* to the server area network 121, way of a low bandwidth channel, such as by way of the low bandwidth satellite communication channel or by way of the Internet 21 or other low bandwidth communication channel. The server area network 121 obtains the requested information and transmits 145 it to the one or more local proxy servers 127–127*b* by way of a selected low or high bandwidth communication channel.

Figure 5:
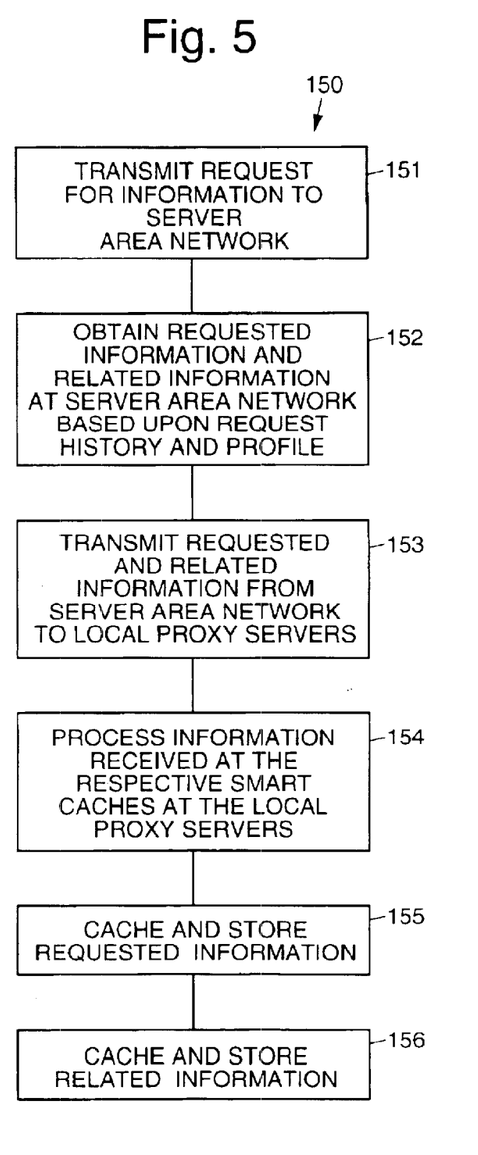
FIG. 5 is a flow diagram illustrating another exemplary Internet communications method in accordance with the principles of the present invention.

FIG. 5 is a flow diagram illustrating another exemplary Internet communications method 150 in accordance with the principles of the present invention. This method 150 processes a user's request to provide the requested information. This method 150 also processes the user's request history and/or user profile to provide information to the user that is related to the requested information. This exemplary method 150 comprises the following steps.

A request for information is transmitted 151 from a local proxy server 127–127*b* to the server area network 121. This may be achieved using either an Internet connection or preferably by way of a low bandwidth satellite communication channel.

The server area network 121 comprises software that processes the request and obtains 152 the requested information. The software preferably also obtains 152 information related to the requested information based upon the request history of the user and/or the user profile.

For example, the software evaluates the qualitative content of the requested information using previous and current requests made by a user and/or the user profile and retrieves or obtains additional information relating to the specifically requested information. The requested and related information are transmitted 153 to the local proxy server 127–127*b*. The requested and related information may transmitted 153 by way of the low or high bandwidth communication links discussed above.

The smart local cache 128–128*b* at the respective local proxy server 127–127*b* receives and processes 154 the requested and related information that was broadcast to it. Software comprising the smart local cache 128–128*b* of the respective local proxy server 127–127*b* caches (stores) 155 the requested information. The software of the smart local cache 128–128*b* also recognizes the information that is related to the requested information that was transmitted from the server area network 121. The software of the smart local cache 128–128*b* also caches (stores) 156 this related information.

Thus, improved broadband data transmission systems and methods have been disclosed. Furthermore, improved data transmission systems and methods that provide low and high bandwidth request and broadcast satellite links and that use request history and user profiles to provide requested and related information to requesting users have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A data transmission system comprising:
   a two-way communication link comprising at least one satellite;
   at least one user terminal having two-way communication with the two-way communication link and comprising a cache for selectively caching data broadcast by way of the satellite of the two-way communication link, and further comprising software which retrieves information requested by way of the user terminal and information related to the requested information; and
   at least one gateway having access to data and having two-way communication with the two-way communication link.

2. The system recited in claim 1 wherein the two-way communication link comprises a low bandwidth two-way communication link.

3. The system recited in claim 2 wherein the low bandwidth two-way communication link comprises a Ka-band communication link.

4. The system recited in claim 1 wherein the two-way communication link comprises a low bandwidth request link and a high bandwidth data broadcast link.

5. The system recited in claim 4 wherein the low bandwidth request link comprises a Ka-band communication link.

6. The system recited in claim 5 wherein the Ka-band communication link provides a plurality of spot beams that cover selected coverage regions.

7. The system recited in claim 4 wherein the high bandwidth broadcast link comprises a Ku-band communication link.

8. The system recited in claim 7 wherein the Ku-band communication link broadcasts a wide area coverage beam to allow the requested information to be received by multiple user terminals.

9. The system in claim 1 wherein the cache has a size on the order of 30 gigabytes.

10. The system in claim 1 wherein the cache comprises a multi-gigabyte hard disk drive.

11. The system recited in claim 1 wherein the at least one gateway comprises a cache.

12. A method of data communication comprising the steps of:
    providing one or more orbiting satellites that comprise a two-way communication link;
    providing at least one user terminal having two-way communication with the two-way communication link and comprising a cache for selectively caching data broadcast by way of the two-way communication link, and further comprising software which retrieves information requested by way of the user terminal and information related to the requested information;
    providing at least one gateway having access to data and having two-way communication with the two-way communication link;

generating requests for data at the at least one user terminal;

transmitting the requests for data from the at least one user terminal by way of the two-way communication link to the at least one gateway;

obtaining the requested data at the at least one gateway; and transmitting the requested data from the at least one gateway to the at least one user terminal by way of the two-way communication link.

13. The method recited in claim 12 wherein the step of transmitting the requests for data comprises transmitting the requests for data by way of a low bandwidth communication link.

14. The method recited in claim 13 wherein the low bandwidth communication link comprises a low bandwidth satellite communication link.

15. The method recited in claim 13 wherein the low bandwidth communication link comprises a low bandwidth terrestrial communication link.

16. The method recited in claim 13 wherein the low bandwidth communication link comprises a low bandwidth wireless communication link.

17. The method recited in claim 12 wherein the step of transmitting the requested data comprises transmitting the data by way of a low bandwidth communication link.

18. The method recited in claim 12 herein the step of transmitting the requested data comprises transmitting the data by way of a high bandwidth data broadcast link.

19. The method recited in claim 12 wherein the step of obtaining the requested data at the at least one gateway comprises using a user's request history to obtain the requested information.

20. The method recited in claim 12 wherein the step of obtaining the requested data at the at least one gateway comprises using a users user profile to obtain the requested information.

21. The method recited in claim 12 further
comprising the steps of:
obtaining the requested data along with data related to the requested data at the at least one gateway; and
transmitting the requested and related data from the at least one gateway to the at least one user terminal by way of the two-way communication link.

22. The method recited in claim 12 further
comprising the steps of:
storing the requested information at the at least one gateway; and
storing the related information at the at least one gateway.

23. The method recited in claim 18 further comprising the step of broadcasting the requested information at predetermined intervals to simulate real-time information broadcasts.

24. The method recited in claim 23 wherein the requested information that is broadcast comprises a predetermined number of most-requested web pages.

25. A data transmission system comprising:
a terrestrial communication link for communicating requests for data;
a satellite broadcast link for transmitting the requested data;
at least one gateway having access to data that communicates with the terrestrial communication link and the satellite broadcast link; and
at least one user terminal that communicates with the terrestrial communication link and the satellite broadcast link and that comprises a cache for caching the requested data broadcast by the satellite broadcast link, and further comprises software which retrieves information requested by way of the user terminal and information related to the requested information.

26. The system recited in claim 25 wherein the at least one gateway comprises a cache.

27. The system recited in claim 25 further comprising a terrestrial communication link for transmitting the requested data to the at least one user terminal in the event that the satellite broadcast link becomes inoperative.

28. A data transmission system comprising:
a two-way communication link comprising at least one satellite;
at least one user terminal having two-way communication with the two-way communication link and comprising a cache for selectively caching data broadcast by way of the satellite of the two-way communication link, and further comprising software which retrieves information requested by way of the user terminal and information related to the requested information; and
at least one gateway having access to data and having two-way communication with the two-way communication link;
which two-way communication link selectively comprises (1) low bandwidth data request and delivery channels, or (2) a low bandwidth data request channel and a high bandwidth data delivery channel, or (3) terrestrial data request and delivery channels.

29. A method of data communication comprising
the steps of:
providing one or more orbiting satellites that comprise a two-way communication link;
providing at least one user terminal having two-way communication with a two-way communication link;
providing at least one gateway having access to data and having two-way communication with the two-way communication link;
generating request for data at the at least one user terminal;
transmitting the request for data from the at least one user terminal by way of the two-way communication link to the at least one gateway;
obtaining the requested data at the at least one gateway; and
transmitting the requested data from the at least one gateway to the at least one user terminal by way of the two-way communication link wherein the requested data is transmitted by way of a high bandwidth data broadcast link at predetermined intervals to simulate real time information broadcasts.

30. A method of data communication comprising
the steps of
providing one or more orbiting satellites that comprise a two-way communication link;
providing at least one user terminal having two-way communication with a two-way communication link;
providing at least one gateway having access to data and having two-way communication with the two-way communication link;
generating request for data at the at least one user terminal;
transmitting the request for data from the at least one user terminal by way of the two-way communication link to the at least one gateway;

obtaining the requested data at the at least one gateway; and transmitting the requested data from the at least one gateway to the at least one user terminal by way of the two-way communication link wherein the requested data is transmitted by way of a high bandwidth data broadcast link at predetermined intervals to simulate real time information broadcasts; wherein the requested information that is broadcast comprises a predetermined number of most requested web pages.

\* \* \* \* \*